(12) United States Patent
Schaible et al.

(10) Patent No.: US 6,980,447 B1
(45) Date of Patent: Dec. 27, 2005

(54) ACTIVE SNUBBER CIRCUIT FOR SYNCHRONOUS RECTIFIER

(75) Inventors: Todd Martin Schaible, Orono, MN (US); John Phillip Schmitz, Oakdale, MN (US)

(73) Assignee: Artesyn Technologies, Inc., Boca Raton, FL (US)

( * ) Notice: Subject to any disclaimer, the term of this patent is extended or adjusted under 35 U.S.C. 154(b) by 0 days.

(21) Appl. No.: 10/967,423

(22) Filed: Oct. 18, 2004

(51) Int. Cl.[7] .............................................. H02M 7/122
(52) U.S. Cl. .................. 363/56.05; 361/91.7
(58) Field of Search ................... 363/56.05, 56.08, 363/56.12; 361/18, 91.7

(56) References Cited

U.S. PATENT DOCUMENTS

| | | |
|---|---|---|
| 5,351,179 A | 9/1994 | Tsai et al. |
| 5,736,842 A * | 4/1998 | Jovanovic .................. 323/222 |
| 5,828,559 A | 10/1998 | Chen |
| 5,877,947 A | 3/1999 | Chen et al. |
| 5,923,153 A | 7/1999 | Liu |
| 5,991,174 A | 11/1999 | Farrington et al. |
| 6,028,418 A | 2/2000 | Jovanovic et al. |
| 6,169,671 B1 | 1/2001 | Mao |
| 6,771,521 B1 | 8/2004 | Xiong et al. |
| 2001/0024353 A1 | 9/2001 | Sanger |
| 2001/0033500 A1 | 10/2001 | Hummert et al. |
| 2001/0045858 A1 | 11/2001 | Alhoussami |
| 2002/0044459 A1 | 4/2002 | Tsubota et al. |
| 2002/0118003 A1 | 8/2002 | Wald |
| 2002/0118496 A1 | 8/2002 | Petruska |
| 2003/0147264 A1 | 8/2003 | Jinno |
| 2004/0085050 A1 | 5/2004 | Jinno |
| 2004/0095788 A1 | 5/2004 | Manthe |

* cited by examiner

Primary Examiner—Shawn Riley
(74) Attorney, Agent, or Firm—Kirkpatrick & Lockhart Nicholson Graham LLP

(57) ABSTRACT

A snubber circuit for use with, for example, a self-driven synchronous rectifier in a power converter is disclosed. The snubber circuit, in various embodiments, captures and recirculates energy from the leakage inductance of the converter in a substantially lossless manner. The snubber circuit comprises a capacitance for storing the energy accumulated in the leakage inductance of a transformer winding of the converter. The snubber circuit further includes a discontinuous inductor, and a switch for transferring, when on, the energy stored in the capacitance to the inductor. The energy in the inductor may then be discharged when the switch is off.

42 Claims, 3 Drawing Sheets

ACTIVE SNUBBER CIRCUIT FOR SYNCHRONOUS RECTIFIER

BACKGROUND OF THE INVENTION

Particularly in a bridge converter with self-driven synchronous rectifiers, there exists a large amount of leakage inductance energy that needs to be captured and either dissipated or recirculated. Otherwise, the synchronous rectifier (which is typically a MOSFET) will be subject to losses due to the leakage inductance energy imposed on the synchronous rectifier during switching transitions. This results in, among other things, reduced efficiency for the converter, and may require physically larger are more expensive components to accommodate the increased voltage levels. Moreover, dissipating the captured energy in a resistive element will produce a large amount of heat that must be managed and will also result in reduced efficiency. Accordingly, there exists a need for a mechanism to recirculate the captured leakage energy in an efficient manner.

SUMMARY OF THE INVENTION

In one general aspect, the present invention is directed to a snubber circuit for use with a self-driven synchronous rectifier in a power converter. The snubber circuit, in various embodiments, captures and recirculates energy from the leakage inductance of a transformer winding of the converter in a substantially lossless manner. According to various embodiments, the snubber circuit comprises a capacitance for storing the energy accumulated in the leakage inductance of the transformer winding of the converter. The snubber circuit further includes a discontinuous inductor, and a switch for transferring, when on, the energy stored in the capacitance to the inductor. The energy in the inductor may then be discharged when the switch is off.

According to various implementations, the switch may be p-channel MOSFET and the control (gate) terminal of the switch may be responsive to the voltage across the synchronous rectifier. For example, the switch may be on when the synchronous rectifier is on. Further, the discontinuous winding may include first and second windings connected to the output of the power converter. The second winding may have more windings than the first winding, and the energy transferred to the inductor may be discharged through a diode connected to the second winding. In addition, for each synchronous rectifier in the converter, the snubber circuit may include a diode for transferring the leakage inductance energy of the transformer winding to the capacitance when the associated synchronous rectifier is off.

In another general aspect, the present invention is directed to a power converter. According to various embodiments, the power converter comprises a transformer winding including a leakage inductance and at least one self-driven synchronous rectifier for rectifying a voltage across the transformer winding. The power converter further includes a snubber circuit, such as described above, for capturing and recirculating the energy from the leakage inductance of the transformer winding.

According to various implementations of the snubber circuit, as the peak voltage on the capacitance increases, the peak current in the inductor increases, and thereby the energy captured and recirculated increases. This natural tendency allows the snubber circuit to maintain a constant peak voltage on the synchronous rectifiers under different load conditions, and keeps the snubber circuit working just as hard as it needs to. These and other benefits of the present invention will be apparent from the description below.

DESCRIPTION OF THE FIGURES

Various embodiments of the present invention are described herein by way of example in conjunction with the following figures, wherein.

DETAILED DESCRIPTION

Figure 1:
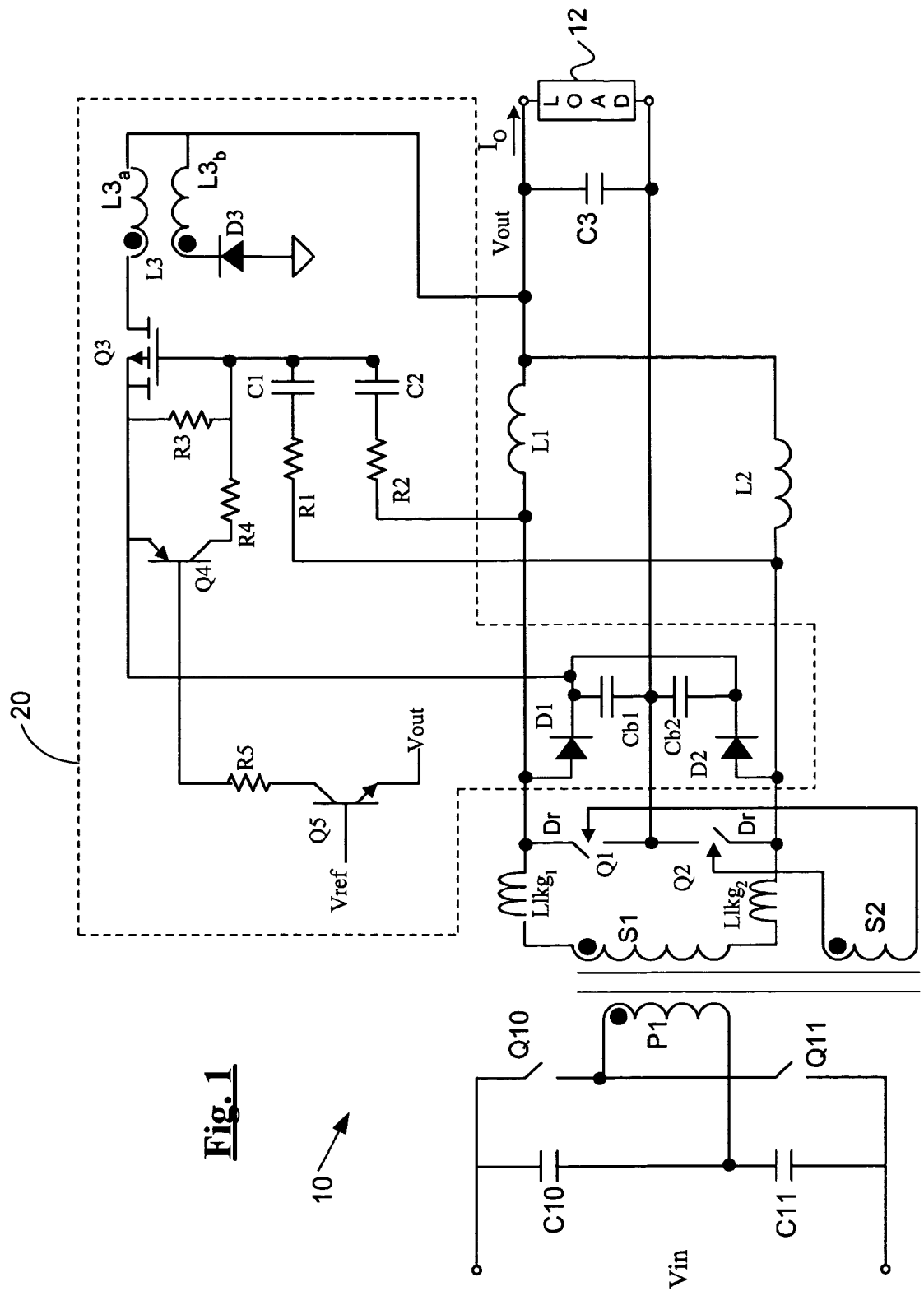
FIG. 1 is a schematic diagram of a power converter including a snubber circuit according to various embodiments of the present invention.
Figure 2:
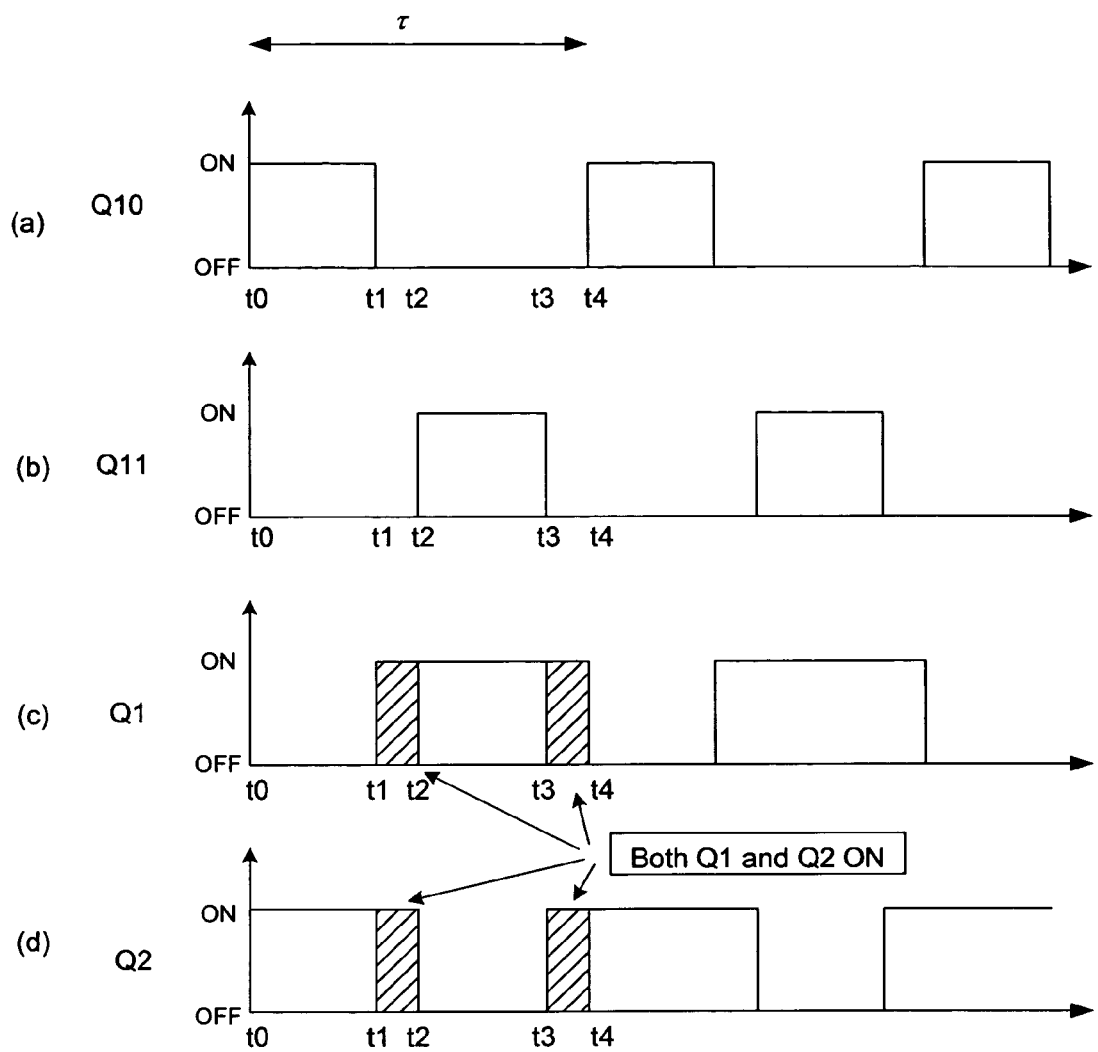
FIGS. 2a–d are idealized timing diagrams illustrating the operation of the converter of FIG. 1 according to various embodiments of the present invention.

FIG. 1 is a diagram of a power converter 10 for converting an input voltage (Vin) to an output voltage (Vout) to power a load 12 according to various embodiments of the present invention. In the illustrated embodiment, the power converter 10 has a half-bridge topology, including two primary switches Q10, Q11, which may be alternately turned on and off in a periodic fashion by a control circuit (not shown) to couple the input power (Vin) to a main power transformer T1. The control circuit may also introduce a dead time between the on periods of the primary switches Q10, Q11, as shown in the timing diagrams of FIG. 2, to regulate the output, to avoid cross-conduction of the switches Q10, Q11, and to possibly realized reduced switching losses due to reduced voltage switching (e.g., zero voltage switching). The control circuit may be an open-loop control circuit (e.g., a fixed duty cycle controller) or a closed-loop control circuit (e.g., a PWM controller), and may include a commercially available controller chip. The primary switches Q10, Q11 may be transistors, and are preferably MOSFETs.

The converter 10 of FIG. 1, employing the half-bridge topology, includes two capacitors C10, C11 connected across the input in a center-tap configuration. The voltage across each capacitor is Vin/2.

In the illustrated embodiment, the transformer T1 includes one primary winding P1 and two secondary windings S1, S2. Two synchronous rectifiers Q1, Q2 are used to rectify the voltage across the first secondary winding S1. The synchronous rectifiers ("SRs") Q1, Q2 may be transistors, and are preferably MOSFETs. The SRs Q1, Q2 in FIG. 1 are self-driven, meaning they are driven by a voltage on a secondary winding of the main power transformer T1. In the example of FIG. 1, the SRs Q1, Q2 are driven by a voltage across the second secondary winding S2 of the transformer T1. Therefore, as shown in the idealized timing diagrams of FIG. 2, the SR Q1 is on (t1 to t4) when the primary switch Q10 is off, and the SR Q2 is on (t0 to t2 and t3 to t4) when the primary switch Q11 is off. Thus, the SRs Q1, Q2 may be simultaneously on for periods (t1 to t2 and t3 to t4) of the switching cycle τ of the converter 10. Also, the first secondary winding S1 of the transformer T1 has a leakage inductance, which is shown discreetly in FIG. 1 as Llkg$_1$ and Llkg$_2$.

In the embodiment of FIG. 1, the converter 10 includes a current doubler configuration. As such, the converter 10 includes two output inductors L1, L2, each carrying half the load current and operating at half the switching frequency of the primary switches Q10, Q11. An output capacitor C3 is connected across the load 12. When Q1 is on and Q2 is off (time t2–t3 in FIG. 2), both L1's and L2's current flows through Q1 and during this time the current is ramped up in L2 and ramped down in L1 (L1 is freewheeling), and when Q1 is off and Q2 is on (time t0–t1), both L1's and L2's current flows through Q2 and during this time the current is ramped up in L1 and ramped down in L2 (L2 is freewheeling). When both SRs Q1 and Q2 are on (t1 to t2 and t3 to t4), both L1 and L2 are freewheeling or dumping energy. The effective ripple current seen by C3 and the load is the sum of L1 and L2 currents and is twice the frequency of either single inductor. This effective ripple down slope is when both Q1 and Q2 are on and the up slope is when either Q1 or Q2 is off.

A relatively large leakage inductance for the main power transformer T1 is required to control the shoot-through current through S1 and the SRs Q1 and Q2 when they are both on as the transformer is energized by Q10 or Q11, until one of the SRs turns off (t2 or t4). At the instance Q10 or Q11 turns on (t2 or t4), Q1 and Q2 are on which creates the shoot through condition or a short across S1 and Llkg$_1$ and Llkg$_2$. There must be enough leakage inductance associated with S1 to allow S2 to develop full voltage to turn off Q1 or Q2 before excessive current develops in S1/P1. This leakage inductance (Llkg$_1$ and Llkg$_2$), however, stores a significant amount of energy ($0.5*LlkgI_o^2$) that must be controlled (i.e., either dissipated or recirculated) during each switching cycle. Otherwise, the energy in the leakage inductance will cause large voltage spikes at the drain terminals (Dr) of the SRs Q1, Q2 at turn on of the SRs (in embodiments where the SRs Q1, Q2 are MOSFETs).

Figure 3:
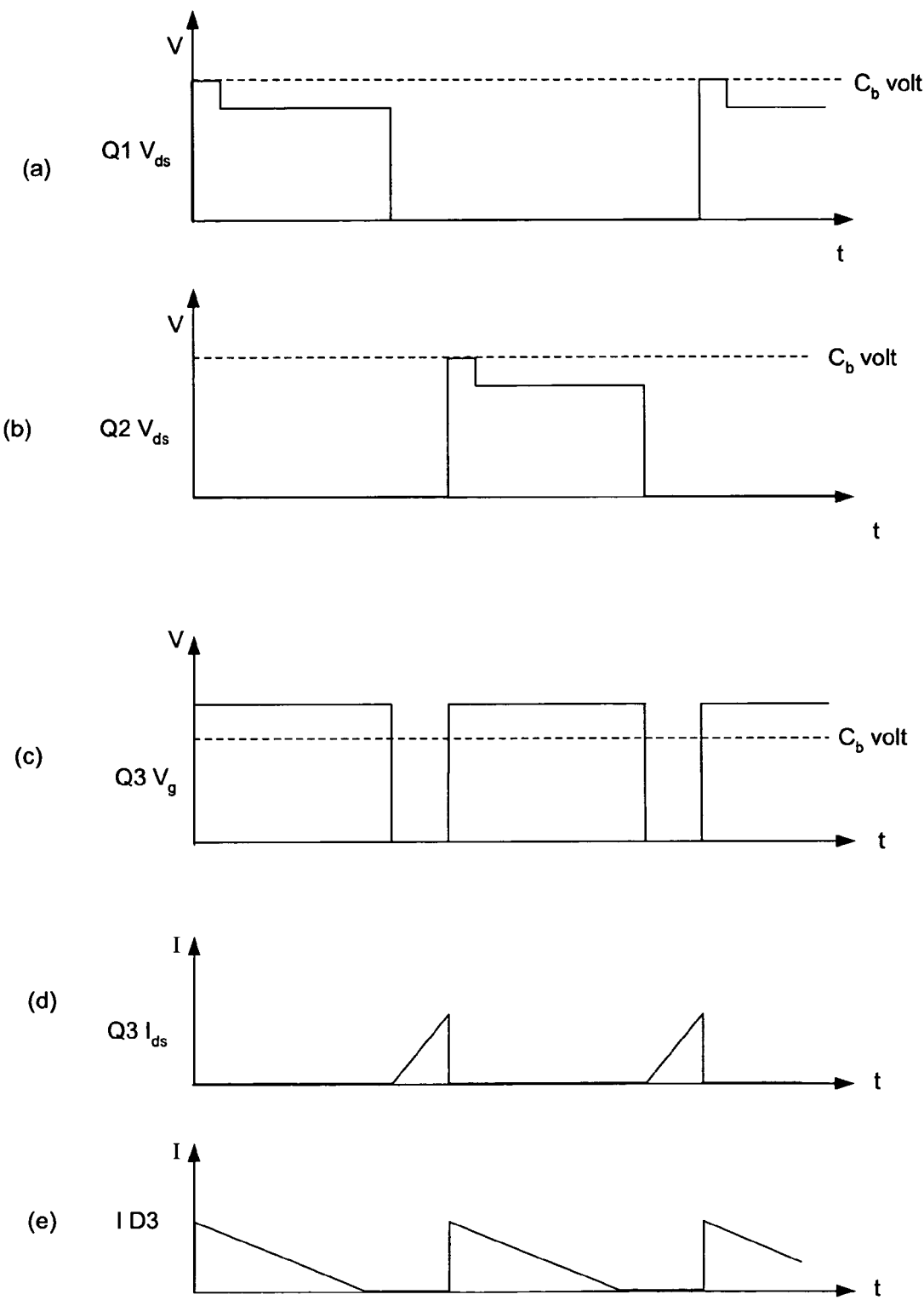
FIGS. 3a–e include idealized voltage and current waveforms for components of the power converter of FIG. 1 according to various embodiments of the present invention.

The snubber circuit 20 shown in FIG. 1 is used to capture and recirculate the energy stored in the leakage inductance of T1. In the illustrated embodiment, the snubber circuit 20 includes a pair of diodes D1, D2 connected to the SRs Q1, Q2, respectively. The energy stored in the leakage inductance is transferred by the diodes D1, D2 to a bulk capacitance $C_b$. That is, when the SR Q1 is off, the diode D1 transfers the energy stored in the leakage inductance Llkg$_1$ to the bulk capacitor $C_b$ and, similarly, when the SR Q2 is off, the diode D2 transfers the energy stored in the leakage inductance Llkg$_2$ to the bulk capacitor $C_b$. The bulk capacitor $C_b$ may be embodied as a single capacitor or, as shown in FIG. 1, may be implemented as a pair of capacitors $C_{b1}$ and $C_{b2}$. In certain applications, it may be preferable to implement the bulk capacitor $C_b$ as such a pair of capacitors to reduce parasitic capacitance from the conduction paths between the SRs Q1, Q2 and the bulk capacitors. The bulk capacitor $C_b$ is preferably large enough to clamp the voltage across the SRs Q1, Q2, as shown in the waveforms of FIGS. 3a, b. For the sake of convenience, in the description to follow the bulk capacitor $C_b$ is referred to as a single capacitor.

The bulk capacitor $C_b$ is connected, in various embodiments, to the source terminal of a normally-on switch Q3. The switch Q3 may be implemented as a p-channel MOSFET that is on when the gate-to-source voltage is below the threshold voltage and off when the gate-to-source voltage exceeds the threshold. The drain terminal of switch Q3 is connected to an inductor L3, which is connected to the output of the converter 10. The inductor L3 preferably includes two magnetically coupled windings (L3$_a$ and L3$_b$), as shown in FIG. 1, to insure that the inductor L3 stays discontinuous. The second winding L3$_b$ is connected to ground through a diode D3. Also, the winding L3$_b$ connected to D3 preferably has more windings than L3$_a$ for reasons that will be apparent from the description to follow.

The gate (i.e., control) terminal of the switch Q3 is controlled by the drains Dr of the SRs Q1, Q2, via RC circuits. That is, the drain of SR Q1 is coupled to the gate of switch Q3 via resistor R2 and capacitor C2, and the drain of SR Q2 is coupled to the gate of switch Q3 via resistor R1 and capacitor C1. Accordingly, when the SRs Q1, Q2 are both on, the drain voltages of the SRs Q1, Q2 are low such that the p-channel switch Q3 is on due to the low voltage at the gate terminal, as shown in FIG. 3c. The switch Q3 being on causes the energy stored in the bulk capacitor $C_b$ to be transferred through the switch Q3 to the inductor L3, as shown in FIG. 3d by the rising current through the switch Q3 during the time periods when Q1 and Q2 are both on. Then, when either Q1 or Q2 turns off, the drain terminal of the on-turning SR (either Q1 or Q2) will go high, causing the switch Q3 to turn off, which causes the energy in the inductor L3 to be discharged through the diode D3, as shown in the waveform of FIG. 3e. Thus, as the peak voltage increases on the bulk capacitor Cb, the peak current increases in the inductor L3 and the energy removed by the snubber circuit 10 increases. This natural tendency allows the snubber circuit 10 to maintain a constant peak voltage on the drains of the SRs Q1, Q2 under different load conditions, and keeps the snubber circuit 10 working just as hard as it needs to recirculate the captured leakage inductance energy.

As mentioned above, winding L3$_b$ may have more windings than L3$_a$ so that there will be enough time to discharge the energy in L3 in the discharge portion of the L3 cycle, as shown in FIGS. 3e. L3 should be sized to control the amount of energy removed from the capacitor(s) Cb.

As shown in FIG. 1, the snubber circuit 20 may also include switches Q4 and Q5. The switches Q4 and Q5, which may be, for example, bipolar transistors as shown in the embodiment of FIG. 1, operate to control the on-time (or duty cycle) of the switch Q3 to keep the current levels on the switch Q3 suitably low. If the output voltage drops low the on times of Q1 and Q2 increase which increases the on time of Q3 which increases the peak current seen by Q3 and L3. The duty cycle of the switch Q3 is controlled by the time constant of capacitors C1, C2 and resistors R4, R3. In the embodiment of FIG. 1, the emitter terminal of the switch Q5 is responsive to the output voltage (Vout) of the converter 10. As such, when the output voltage Vout drops low, the switch Q5 will turn on, which turns on switch Q4, causing C1 and C2 to discharge and thereby reducing the duty cycle of the switch Q3. Accordingly, in such embodiments, the snubber circuit 10 may run at a reduced level during fault or start-up conditions.

As used herein, the term "on" when used in reference to the state of a transistor means that the transistor is in a low impedance state, and the term "off" when used in reference to the state of a transistor means that the transistor is in a high impedance state. Also, the term "connected" as used herein does not necessarily mean directly connected, unless so noted.

In FIG. 1, the converter 10 is shown as a half-bridge converter with a current doubler secondary configuration. In other embodiments, different converter topologies may be used. In addition, although the embodiments of the snubber circuit 20 described herein are preferably used with self-driven synchronous rectifiers, it should be noted that the snubber circuit 20 could be used to snub the energy on any type of transistor where suitable, including, for example, a control-driven SR.

Although the present invention has been described herein with respect to certain embodiments, those of ordinary skill in the art will recognize that many modifications and variations of the present invention may be implemented. For example, there may be additional windings magnetically coupled to the main power transformer T1. Also, any of the semiconductor switches described herein may be implemented as a single semiconductor switch or a number of semiconductor switches connected in parallel. The foregoing description and the following claims are intended to cover all such modifications and variations.

What is claimed is:

1. A snubber circuit for a self-driven synchronous rectifier used in a power converter, wherein the synchronous rectifier is for rectifying a voltage across a transformer winding, and wherein the transformer winding has a leakage inductance, the snubber circuit comprising:
   a capacitance for storing energy accumulated in the leakage inductance of the transformer winding;
   a discontinuous inductor that comprises first and second windings connected at a common node; and
   a switch for transferring, when on, the energy stored in the capacitance to the discontinuous inductor, wherein the first winding of the discontinuous inductor is connected to the switch and the common node is connected to the output of the power converter.

2. The snubber circuit of claim 1, wherein a control terminal of the switch is responsive to the voltage across the synchronous rectifier.

3. The snubber circuit of claim 2, wherein the switch is on when the synchronous rectifier is on.

4. The snubber circuit of claim 2, wherein the switch includes a p-channel MOSFET that is on when the synchronous rectifier is on.

5. The snubber circuit of claim 2, wherein
   the second winding of the discontinuous inductor is connected to a first diode.

6. The snubber circuit of claim 5, wherein the second winding has more windings than the first winding.

7. The snubber circuit of claim 6, wherein the energy stored in the discontinuous inductor is discharged through the first diode when the switch is off.

8. The snubber circuit of claim 7, further comprising a second diode connected to the capacitance, such that the energy stored in the leakage inductance of the transformer winding is transferred to the capacitance via the second diode.

9. The snubber circuit of claim 8, wherein the energy stored in the leakage inductance of the transformer winding is transferred to the capacitance via the second diode when the synchronous rectifier is off.

10. The snubber circuit of claim 9, further comprising a circuit connected to the switch for reducing the duty cycle of the switch when the output voltage of the converter goes low.

11. A power converter comprising:
    a transformer winding including a leakage inductance;
    at least one self-driven synchronous rectifier for rectifying a voltage across the transformer winding;
    a snubber circuit connected to the synchronous rectifier, wherein the snubber circuit includes:
      a capacitance for storing energy accumulated in the leakage inductance of the transformer winding;
      a discontinuous inductor that comprises first and second windings connected at a common node; and
      a switch for transferring, when on, the energy stored in the capacitance to the discontinuous inductor, wherein the first winding of the discontinuous inductor is connected to the switch and the common node is connected to the output of the power converter.

12. The power converter of claim 11, wherein a control terminal of the switch is responsive to the voltage across the synchronous rectifier.

13. The power converter of claim 12, wherein the switch is on when the synchronous rectifier is on.

14. The power converter of claim 12, wherein the switch includes a p-channel MOSFET that is on when the synchronous rectifier is on.

15. The power converter of claim 12, wherein
    the second winding of the discontinuous inductor is connected to a first diode.

16. The power converter of claim 15, wherein the second winding has more windings than the first winding.

17. The power converter of claim 16, wherein the energy stored in the discontinuous inductor is discharged through the first diode when the switch is off.

18. A power converter comprising:
    a transformer winding including a leakage inductance;
    a first self-driven synchronous rectifier connected to a first terminal of the transformer winding for rectifying a voltage across the transformer winding;
    a second self-driven synchronous rectifier connected to a second terminal of the transformer winding for rectifying a voltage across the transformer winding; and
    a snubber circuit connected to the first and second synchronous rectifiers, wherein the snubber circuit includes:
      a capacitance for storing energy accumulated in the leakage inductance of the transformer winding;
      a discontinuous inductor that comprises first and second windings connected at a common node; and
      a switch for transferring, when on, the energy stored in the capacitance to the discontinuous inductor, wherein the first winding of the discontinuous inductor is connected to the switch and the common node is connected to the output of the power converter.

19. The power converter of claim 18, wherein a control terminal of the switch is responsive to the voltage across the first and second synchronous rectifiers.

20. The power converter of claim 19, wherein the switch is on when the at least one of the first and second synchronous rectifiers is on.

21. The power converter of claim 20, wherein the switch includes a p-channel MOSFET that is on when at least one of the first and second synchronous rectifiers is on.

22. The power converter of claim 21, wherein:
    the second winding is connected to a first diode; and
    the second winding has more windings than the first winding, such that energy stored in the discontinuous inductor is discharged through the first diode when the switch is off.

23. The power converter of claim 22, further comprising:
    a second diode connected to the capacitance, such that the energy stored in the leakage inductance of the transformer winding is transferred to the capacitance via the second diode when the first synchronous rectifier is off; and
    a third diode connected to the capacitance, such that the energy stored in the leakage inductance of the transformer winding is transferred to the capacitance via the third diode when the second synchronous rectifier is off.

24. The power converter of claim 23, wherein the snubber circuit further comprises a circuit connected to the switch for reducing the duty cycle of the switch when the output voltage of the converter goes low.

25. The power converter of claim 18, wherein the capacitance includes two capacitors connected together.

26. A method of capturing and recirculating leakage inductance energy in a power converter including a synchronous rectifier, comprising:
    transferring the leakage inductance energy to a capacitance when the synchronous rectifier is off;
    transferring the energy from the capacitance to a discontinuous inductor via a switch when the switch is on, wherein the discontinuous inductor comprises first and second windings connected at a common node, and wherein the first winding of the discontinuous inductor is connected to the switch and the common node is connected to the output of the power converter; and
    discharging the inductance when the switch is off.

27. The method of claim 26, further comprising controlling the switch with the voltage across the synchronous rectifier.

28. The method of claim 27, wherein the switch includes a p-channel MOSFET that is on when the synchronous rectifier is on.

29. The method of claim 27, wherein
    the second winding of the discontinuous inductor is connected to a first diode.

30. The method of claim 29, wherein the second winding has more windings than the first winding.

31. The method of claim 30, wherein the energy stored in the discontinuous inductor is discharged through the first diode when the switch is off.

32. The method of claim 31, further comprising a second diode connected to the capacitance, such that the energy stored in the leakage inductance of the transformer winding is transferred to the capacitance via the second diode.

33. The method of claim 32, wherein the energy stored in the leakage inductance of the transformer winding is transferred to the capacitance via the second diode when the synchronous rectifier is off.

34. The method of claim 33, further comprising reducing the duty cycle of the switch when the output voltage of the converter goes low.

35. A snubber circuit for a transistor connected to an inductive winding, wherein the inductive winding has a leakage inductance, the snubber circuit comprising:
    a capacitance for storing energy accumulated in the leakage inductance of the inductive winding;
    a discontinuous inductor that comprises first and second windings connected at a common node; and
    a switch for transferring, when on, the energy stored in the capacitance to the discontinuous inductor, wherein a control terminal of the switch is responsive to the voltage across the transistor, and wherein the first winding of the discontinuous inductor is connected to the switch and the second winding is connected to a first diode.

36. The snubber circuit of claim 35, wherein the switch is on when the transistor is on.

37. The snubber circuit of claim 35, wherein the switch includes a p-channel MOSFET that is on when the transistor is on.

38. The snubber circuit of claim 35, wherein the second winding has more windings than the first winding.

39. The snubber circuit of claim 38, wherein the energy stored in the discontinuous inductor is discharged through the first diode when the switch is off.

40. The snubber circuit of claim 39, further comprising a second diode connected to the capacitance, such that the energy stored in the leakage inductance of the inductive winding is transferred to the capacitance via the second diode.

41. The snubber circuit of claim 40, wherein the energy stored in the leakage inductance of the inductive winding is transferred to the capacitance via the second diode when the transistor is off.

42. The snubber circuit of claim 35 wherein the transistor includes a self-driven synchronous rectifier.

* * * * *